(12) United States Patent
Shiroto

(10) Patent No.: US 10,802,590 B2
(45) Date of Patent: Oct. 13, 2020

(54) INPUT DEVICE

(71) Applicant: DENSO TEN Limited, Kobe-shi, Hyogo (JP)

(72) Inventor: Hironori Shiroto, Kobe (JP)

(73) Assignee: DENSO TEN Limited, Kobe (JP)

( * ) Notice: Subject to any disclaimer, the term of this patent is extended or adjusted under 35 U.S.C. 154(b) by 259 days.

(21) Appl. No.: 15/922,298

(22) Filed: Mar. 15, 2018

(65) Prior Publication Data

US 2018/0348871 A1 Dec. 6, 2018

(30) Foreign Application Priority Data

May 31, 2017 (JP) ................................ 2017-107869

(51) Int. Cl.
| | |
|---|---|
| *G06F 3/01* | (2006.01) |
| *B60K 37/06* | (2006.01) |
| *B60K 35/00* | (2006.01) |
| *G06F 3/041* | (2006.01) |

(52) U.S. Cl.
CPC .............. *G06F 3/016* (2013.01); *B60K 35/00* (2013.01); *B60K 37/06* (2013.01); *B60K 2370/1438* (2019.05); *B60K 2370/158* (2019.05); *G06F 3/0412* (2013.01); *G06F 2203/014* (2013.01)

(58) Field of Classification Search
CPC .. G06F 3/016; G06F 2203/014; A63F 13/285; A63F 2300/1037
USPC ........................................ 340/407.1; 715/702
See application file for complete search history.

(56) References Cited

U.S. PATENT DOCUMENTS

| | | | | |
|---|---|---|---|---|
| 7,825,778 B2 * | 11/2010 | Nishimura | .............. | G06F 3/016 340/407.2 |
| 2010/0141410 A1 * | 6/2010 | Aono | .................... | G06F 3/0414 340/407.2 |
| 2010/0144395 A1 * | 6/2010 | Komiya | ............ | H04M 1/72519 455/566 |
| 2012/0056826 A1 * | 3/2012 | Kim | ........................ | G06F 3/016 345/173 |
| 2012/0098781 A1 * | 4/2012 | Kim | ........................ | G06F 3/044 345/174 |

(Continued)

FOREIGN PATENT DOCUMENTS

JP 2012-216206 A 11/2012

*Primary Examiner* — Koosha Sharifi-Tafreshi
(74) *Attorney, Agent, or Firm* — Oliff PLC

(57) ABSTRACT

An input device according to one aspect of an embodiment includes an operation panel, a vibrator, a support panel, and an adhesive portion. The operation panel has an operation surface. The vibrator is mounted on a peripheral region of the operation panel and vibrates the operation panel in a plurality of modes having different vibration frequencies. The support panel is disposed to face a back surface of the operation panel that is opposite to the operation surface of the operation panel and supports the operation panel. The adhesive portion adheres the operation panel and the support panel to each other. In addition, the adhesive portion includes a first adhesive portion and a second adhesive portion. The first adhesive portion adheres the peripheral region of the operation panel on which the vibrator is mounted and the support panel to each other. The second adhesive portion has a higher hardness than a hardness of the first adhesive portion, and adheres a region other than the peripheral region of the operation panel and the support panel to each other.

11 Claims, 5 Drawing Sheets

(56) References Cited

U.S. PATENT DOCUMENTS

2013/0009893 A1\* 1/2013 Okumura ............... G06F 3/041
                                                            345/173

\* cited by examiner

INPUT DEVICE

BACKGROUND OF THE INVENTION

Field of the Invention

The present invention relates to an input device and an input system.

Description of the Background Art

In the related art, an input device that allows a user to recognize acceptance of an input operation by giving a sense of touch to the user has been known. In the input device, for example, vibration is generated responding to a pressure force by the user acting on an operation surface, which allows the user to recognize acceptance of the input operation.

However, the input device has room for improvement in that vibration is effectively generated on the operation panel having the operation surface. That is, the operation panel is supported by a support panel. The operation panel and the support panel adhere to each other by an adhesive portion such as a double-sided tape. In addition, in the input device, the operation panel can be vibrated in a plurality of modes in which vibration frequencies are different, for example, high frequency vibration and low frequency vibration.

Here, when the rigidity of the operation panel or the adhesive portion is increased as the vibration frequency increases, the vibration described above is easily generated on the operation panel. However, for example, if the hardness of the adhesive portion is made relatively high in order to enhance the strength of the adhesive portion, high frequency vibration is easily generated on the operation panel, but low frequency vibration is hard to be generated. On the contrary, for example, if the hardness of the adhesive portion is made relatively low to lower the rigidity of the adhesive portion, low frequency vibration is easily generated on the operation panel, whereas high frequency vibration is hard to be generated in the other hand. For this reason, the related art has room for improvement in that the vibration of a plurality of modes in which vibration frequencies are different is effectively generated on the operation panel.

SUMMARY OF THE INVENTION

According to one aspect of the present invention, there is provided an input device including an operation panel that has an operation surface, a vibrator that is mounted on a peripheral region of the operation panel, and vibrates the operation panel in a plurality of modes having different vibration frequencies, a support panel that is disposed to face a back surface of the operation panel that is opposite to the operation surface of the operation panel and supports the operation panel, and an adhesive portion that adheres the operation panel and the support panel to each other, the adhesive portion including a first adhesive portion that adheres the peripheral region of the operation panel on which the vibrator is mounted and the support panel to each other, and a second adhesive portion that has a higher hardness than a hardness of the first adhesive portion and adheres a region other than the peripheral region of the operation panel and the support panel to each other.

It is possible to effectively generate vibrations of a plurality of modes in which vibration frequencies are different on the operation panel.

In addition, according to another aspect of the present invention, a plurality of the vibrators are mounted in a region outside the operation surface, adjacent to opposite ends of the operation surface, and a boundary between the first adhesive portion and the second adhesive portion is flush with opposing side surfaces of the plurality of vibrators.

The standing wave can be more effectively generated on the operation panel.

Therefore, an object of the present invention is to provide an input device and an input system capable of effectively generating vibrations of a plurality of modes in which vibration frequencies are different on the operation panel.

These and other objects, features, aspects and advantages of the present invention will become more apparent from the following detailed description of the present invention when taken in conjunction with the accompanying drawings.

DESCRIPTION OF THE EMBODIMENTS

Hereinafter, embodiments of an input device and an input system disclosed in the present invention will be described in detail with reference to accompanying drawings. The present invention is not limited to the embodiments described below.

1. Outline of Input Device

Figure 1:
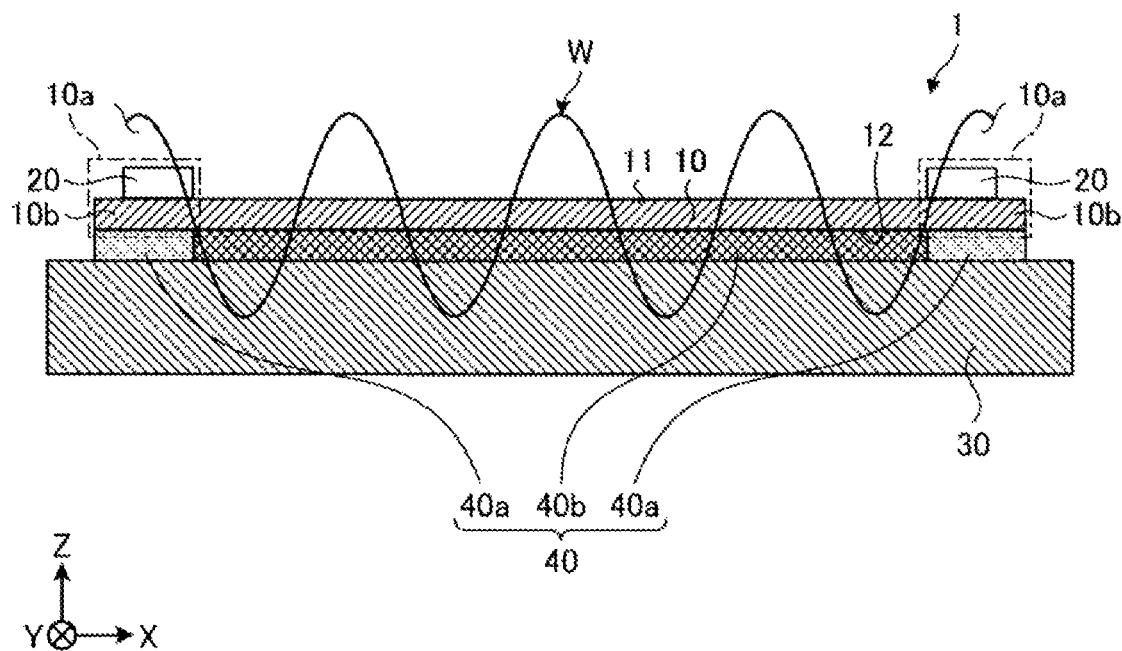
FIG. 1 is a side cross sectional view of an input device according to an embodiment.

In the following, first, an outline of an input device according to an embodiment will be described using FIG. 1. FIG. 1 is a side cross sectional view of an input device according to an embodiment.

Figure 4:
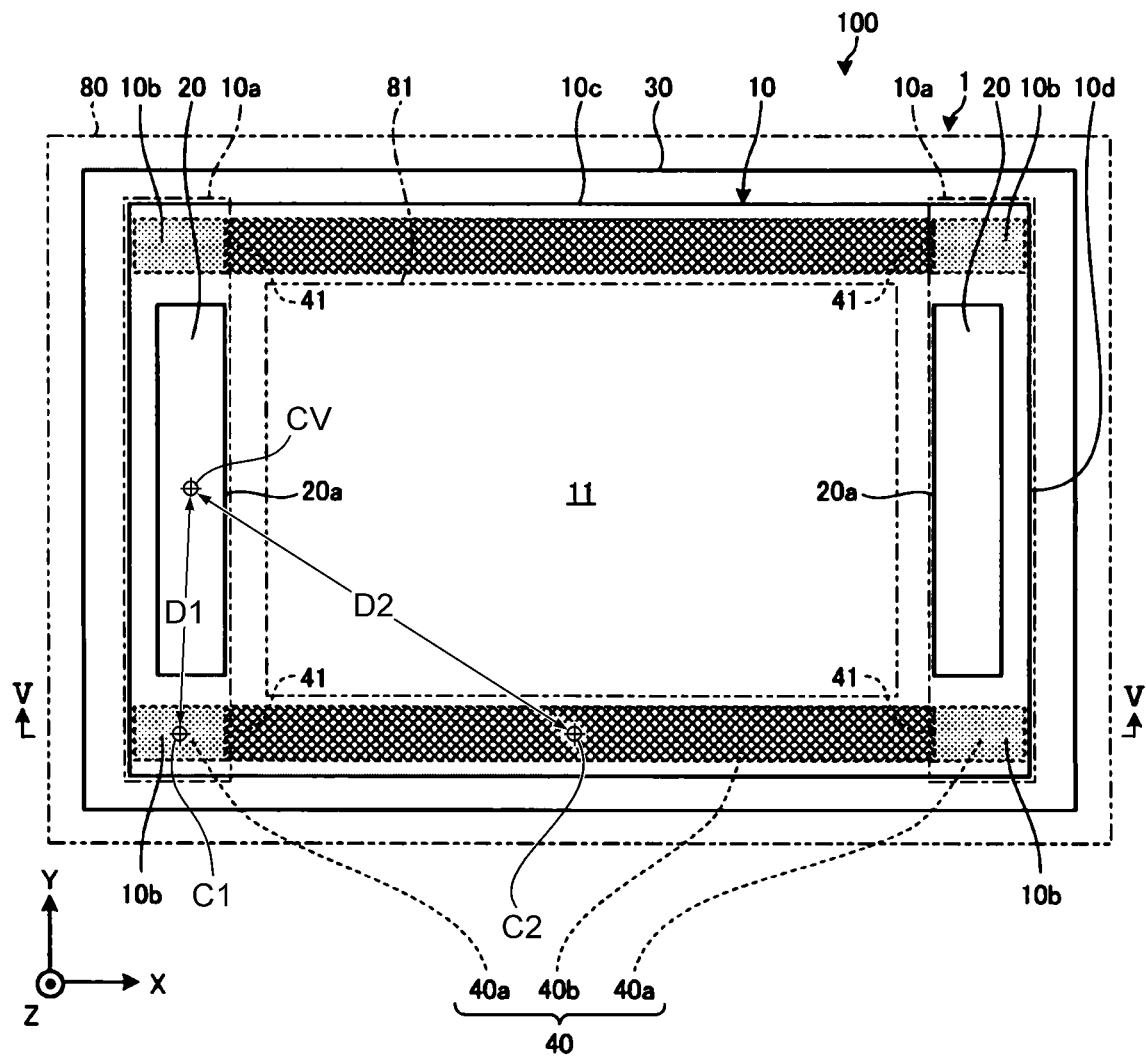
FIG. 4 is a plan view of an input system according to the embodiment.

In addition, FIG. 1 and FIG. 4 and the subsequent figures are schematic views. Therefore, the size, shape, and the like of each constituent element shown in FIG. 1, and so on are not necessarily accurate. In each figure, in some cases each constituent element is shown in exaggeration for convenience of understanding. In FIG. 1, a three-dimensional orthogonal coordinate system including an X axis, a Y axis and a Z axis is shown. The three-dimensional orthogonal coordinate system may be represented in other figures.

As shown in FIG. 1, the input device 1 includes an operation panel 10, vibrators 20, a support panel 30, and an adhesive portion 40. The input device 1 can be used, for example, as a touch panel having a vibration function in which the operation surface 11 of the operation panel 10 is vibrated by being controlled by a controller (not shown). Further, as described below, the input device 1 and the controller can be used as the touch panel having a vibration function in combination with a display such as a liquid crystal display.

The operation panel 10 is a flat plate member, and has an operation surface 11 substantially at the center. The operation panel 10 has a function of detecting a contact position of a user with the operation surface 11. For example, the operation panel 10 includes a capacitive type contact sensor (not shown), and the contact position of the user with the operation surface 11 can be detected by the contact sensor. When the operation panel 10 does not have the function of detecting the contact position, the support panel 30 may have the function of detecting the contact position, or a configuration having the function of detecting the contact position may be separately disposed. The contact of the user with the operation surface 11 is performed, for example, by the user bring a finger or the like into contact with the operation surface 11, or bring a touch pen or the like into contact with the operation surface 11.

The vibrators 20 are vibration elements, for example, piezoelectric elements (piezo elements) or the like. There is a plurality of vibrators 20 (here, two vibrators). In the example shown in FIG. 1, two vibrators 20 are present; however, it is not limited to two, so the number of the vibrator may be one or three or more.

The vibrators 20 are, for example, mounted near ends of the operation panel 10, respectively. The vibrators 20 are fixedly mounted on the operation surface 11 of the operation panel 10 with an adhesive or the like. Then, the vibrators 20 vibrate the operation panel 10. For example, the vibrators 20 are controlled by the controller, and can vibrate the operation panel 10 in a plurality of modes in which vibration frequencies are different.

Specifically, the vibrators 20 vibrate the operation panel 10 at a high frequency in an ultrasonic band in a state where the user's finger is in contact with the operation surface 11, or vibrates the operation panel 10 at a frequency lower than the ultrasonic band. In this way, a slippery feel and a tremblingly vibratory feel can be given to the user's finger on the operation surface 11, which will be described later with reference to FIG. 3.

The support panel 30 supports the operation panel 10. Specifically, the support panel 30 is a flat plate member. The support panel 30 is disposed to face a back surface 12 opposite to the operation surface 11 of the operation panel 10 and supports the operation panel 10.

The adhesive portion 40 allows the operation panel 10 and the support panel 30 to adhere to each other. For the operation panel 10, the entire surface does not adhere to the support panel 30 by the adhesive portion 40, but a partial area, for example, a long side or the like, adheres to the support panel 30, which will be described later with reference to FIG. 4.

However, as described above, in the input device 1 according to the present embodiment the operation panel 10 is vibrated in a plurality of modes in which vibration frequencies are different, such as high frequency vibration and low frequency vibration.

When the input device 1 vibrates the operation panel 10 at high frequency in the ultrasonic band, a standing wave W is generated on the operation panel 10. The standing wave W is easily generated on the operation panel 10, for example, when rigidity is increased by increasing the hardness of the adhesive portion 40. Specifically, for example, when rigidity is low by decreasing the hardness of the adhesive portion 40, vibrations of the vibrators 20 are absorbed by the adhesive portion 40, and as a consequence, there is a possibility that the generation of the standing wave W of the operation panel 10 is hindered. For this reason, when the input device 1 vibrates the operation panel 10 at a high frequency, it is preferable that the hardness of the adhesive portion 40 is high.

However, when rigidity is increased by increasing the hardness of the adhesive portion 40, it becomes difficult for the operation panel 10 to be displaced with respect to the support panel 30, that is, it becomes difficult to sway. For this reason, even if the input device 1 tries to vibrate the operation panel 10 at a low frequency, the low frequency vibration is hard to be generated on the operation panel 10. That is, in a case where the input device 1 vibrates the operation panel 10 at a low frequency, it is preferable to lower the hardness of the adhesive portion 40 so as to make the operation panel 10 sway with respect to the support panel 30. In this way, the preferable hardness of the adhesive portion 40 for the high frequency vibration and the low frequency vibration is different from each other.

Therefore, in the present embodiment, the adhesive portion 40 includes a plurality of adhesive portions (here, two) having different hardnesses. In this way, it is possible to effectively generate vibrations of a plurality of modes in which vibration frequencies are different on the operation panel 10.

Specifically, the adhesive portion 40 according to the present embodiment includes a first adhesive portion 40a and a second adhesive portion 40b. In FIG. 1 and the following figures, the first adhesive portion 40a is indicated by dots, and the second adhesive portion 40b is indicated by hatching so as to clearly show the positions where the first and second adhesive portions 40a and 40b are provided.

The first adhesive portions 40a are provided at positions where peripheral regions 10a of the vibrators 20 adhere to the support panel 30 on the operation panel 10. For example, when the vibrators 20 are mounted on an end portions of the operation panel 10, the peripheral regions 10a include four corners 10b in the vicinity of the vibrators 20 on the operation panel 10 (See FIG. 4). The peripheral region 10a is not limited thereto, and may be set anywhere in the vicinity of the vibrator 20.

The first adhesive portion 40a is an adhesive portion having a relatively low hardness. As the first adhesive portion 40a, for example, an adhesive tape (double-sided tape) with expanded polyolefin foam as a base material can be used.

In this way, since the first adhesive portion 40a having a low hardness is provided at the position where the peripheral region 10a of the vibrator 20 and the support panel 30 adhere to each other, the operation panel 10 is easily swayed with respect to the support panel 30, which is a state similar to what is called a floating state. In this way, when the vibrators 20 are vibrated at a low frequency, the input device 1 can effectively generate vibration of a low frequency on the operation panel 10 with the vibrations of the vibrators 20.

The second adhesive portion 40b is provided at a position where a region other than the peripheral regions 10a of the vibrators 20 on the operation panel 10 (for example, region on the long side 10c of the operation panel 10, see FIG. 4) and the support panel 30 adhere to each other. The region of the peripheral region 10a and the vicinity of the region includes a region where the standing wave W is generated when the input device 1 vibrates the operation panel 10 at a high frequency in the ultrasonic band.

The second adhesive portion 40b is an adhesive portion having a relatively high hardness, specifically an adhesive portion having a higher hardness than that of the first adhesive portion 40a. As the second adhesive portion 40b, for example, an adhesive tape (double-side tape) with Acrylic as a base material can be used.

In this way, since the second adhesive portion 40b having a high hardness is provided at the position where the region other than the peripheral regions 10a of the vibrators 20 and the support panel 30 adhere to each other, it becomes difficult that the vibrations of the vibrators 20 are absorbed by the second adhesive portion 40b. In this way, when the vibrators 20 are vibrated at a high frequency, the input device 1 can effectively generate the standing wave W on the operation panel 10 with the vibrations of the vibrators 20.

In the same regard, as shown in FIG. 4, a distance D2 from a centroid C2 of the second adhesive portion 40b to the respective one of the vibrators 20 is longer than a distance D1 from a centroid C1 of a respective one of the first adhesive portions 40a to a centroid CV of a respective one of the vibrators 20.

In this way, in the present embodiment, since the first and second adhesive portions 40a, 40b which have different hardnesses are provided, it is possible to effectively generate vibrations of a plurality of modes in which vibration frequencies are different, such as high frequency vibration and low frequency vibration, on the operation panel 10.

2. Example of Mounting of Electronic Device System

Figure 2:
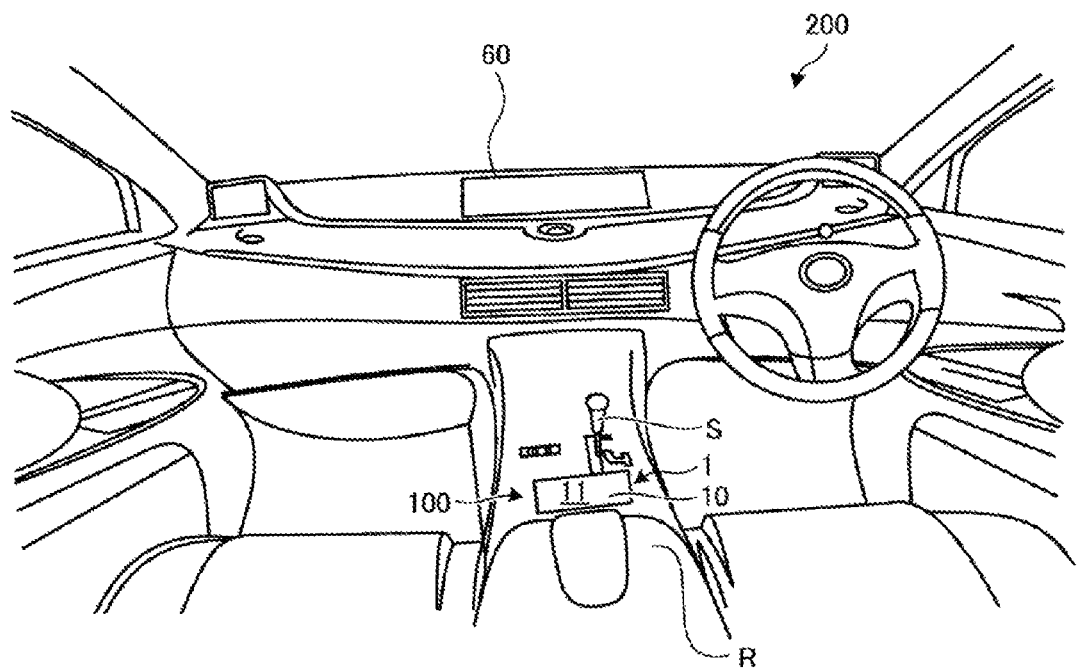
FIG. 2 is a view showing an example of mounting of an electronic device system according to the embodiment.

FIG. 2 is a view showing a view showing an example of mounting of an electronic device system 200 including an input system 100 provided with the input device 1 according to the embodiment. As shown in FIG. 2, the electronic device system 200 according to the present embodiment is mounted on a vehicle as one example.

The electronic device system 200 includes the input system 100 and a display device 60. The input system 100 is connected in-vehicle devices, such as the display device 60 or a speaker, for example, through network communication, and functions as an input device of the in-vehicle devices. In addition, the input system 100 includes the input device 1, and the input device 1 can be used as the touch pad as described above.

The operation surface 11 of the operation panel 10 is disposed at a position where a driver can operate it easily, for example, in the vicinity of a shift lever S of a center console. In the example of FIG. 2, the operation surface 11 is disposed between an arm lever R and the shift lever S. Therefore, the user can operate the operation surface 11 with the arm of the user placed on the arm lever R. In this way, the user can easily operate the input system 100 without rearranging the user's driving posture.

Examples of the in-vehicle device include various devices, such as the display device 60 for displaying a predetermined image, a speaker for outputting predetermined sound, an air conditioner, a car navigation system and the like. Therefore, the user can operate such various devices by operating the input system 100.

When an input operation from the user is accepted, the above-described input system 100 generates high frequency vibration and low frequency vibration on the operation panel 10 in accordance with the input operation, thereby allowing the user to recognize the acceptance of the input operation.

3. Details of Electronic Device System

Figure 3:
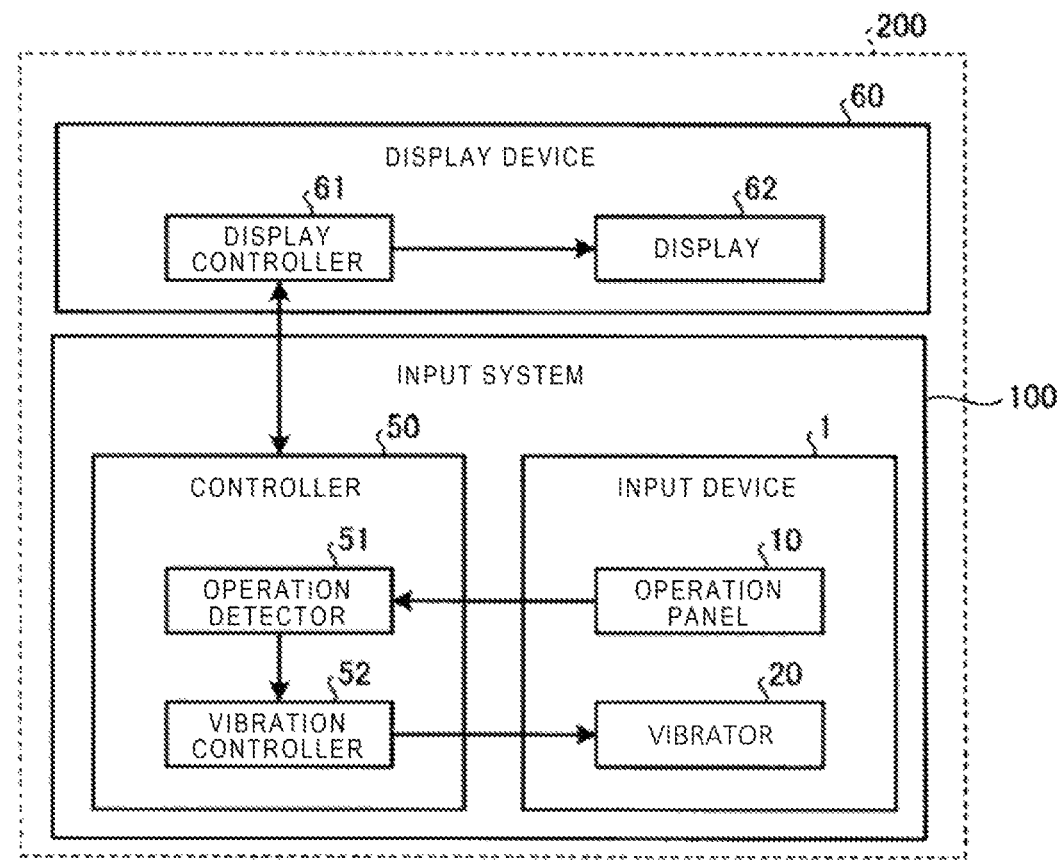
FIG. 3 is a view showing an example of a configuration of the electronic device system according to the embodiment.

Next, the electronic device system 200 according to the embodiment will be described using FIG. 3. FIG. 3 is a view showing an example of a configuration of the electronic device system 200 according to the embodiment. In FIG. 3, only constituent elements necessary for describing the features of the present embodiment is shown as functional blocks, and descriptions of general constituent elements will be omitted.

In other words, each constituent element shown in FIG. 3 is functionally conceptual, and does not necessarily need to be physically configured as shown. For example, specific forms of distribution and integration of each functional block are not limited to the forms shown in the drawings, and can be configured by physically or functionally distributing and integrating all or a part of the forms in arbitrary units according to various loads and usage situations.

As shown in FIG. 3, the electronic device system 200 includes the input system 100 and the display device 60. The input system 100 includes the input device 1 and the controller 50. The input device 1 accepts the input operation from the user. The input device 1 includes the operation panel 10 and the vibrator 20 described above. When an input performed by the user is accepted through the operation surface 11, the operation panel 10 detects a contact position of the user with the operation surface 11 and outputs a signal including information corresponding to the detected contact position (for example, coordinate information) to the controller 50.

The controller 50 controls the vibrator 20 according to the detected contact position by the operation panel 10 of the input device 1. The controller 50 is a microprocessor including a central processing unit (CPU), a storage, and the like.

The controller 50 includes an operation detector 51 and a vibration controller 52. The operation detector 51 detects the input operation which the user performs on the operation surface 11 based on the information of the contact position output from the operation panel 10.

For example, when the electronic device system 200 is used as a car navigation system, if the information of the contact position output from the operation panel 10 is the position corresponding to a destination setting button on the operation surface 11, the operation detector 51 detects that an input operation by the user is an input operation to set the destination.

When the input operation performed by the user on the operation surface 11 is detected, the operation detector 51 outputs a signal indicating the detected input operation to the vibration controller 52 and the display device 60.

The vibration controller 52 outputs a voltage signal to the vibrator 20 based on a signal output from the operation detector 51, that is the signal indicating the input operation of the user to control the vibrator 20. That is, the vibration controller 52 controls the vibrator 20 based on the input operation on the operation surface 11.

Specifically, the vibration controller 52 can control the vibrator 20 so as to vibrate the operation panel 10 in a plurality of modes in which the vibration frequencies are different, based on the input operation on the operation surface 11. More specifically, the vibration controller 52 can control the vibrator 20 so as to switch between the mode in which the vibration of the frequency in the ultrasonic band is generated on the operation panel 10 and the mode in which the vibration in the frequency band lower than the ultrasonic band is generated on the operation panel 10 based on the input operation on the operation surface 11.

The frequency in the ultrasonic band described above (high frequency) is, for example, 20 to 40 kHz, and the frequency lower than the ultrasonic band (low frequency) is, for example, 200 Hz or less, but the frequencies are not limited thereto. The mode in which vibration is generated at the high frequency in the ultrasonic band is one example of a first vibration mode. The mode in which vibration is generated at the low frequency is one example of a second vibration mode.

When the vibration controller 52 controls the vibrator 20 to vibrate the operation panel 10 at the high frequency in the ultrasonic band, the standing wave W (see FIG. 1) is generated on the operation panel 10, thereby making it possible to reduce the frictional force of the operation surface 11 with respect to the user using the squeeze effect.

The squeeze effect refers to a phenomenon that, when the standing wave W is generated by vibrating the operation surface 11 at a high frequency by the vibrator 20, an air layer is formed between the user's finger and the operation surface 11 due to pressure fluctuation by vibration, and thus the frictional resistance between the user's finger and the operation surface 11 becomes relatively low compared to when there is no vibration.

From the fact that the frictional force on the operation surface 11 of the operation panel 10 is reduced, for example, it is possible to give the user a smooth tactile sensation as if the user is sucked in the sliding direction of the sliding operation of the user moving the finger on the operation surface 11 of the operation panel 10.

Further, when the vibration controller 52 controls the vibrator 20 to vibrate the operation panel 10 at a low frequency in a state in which the user's finger is in contact with the operation surface 11, it is possible to give the user a trembling tactile sensation by transferring the vibration of the vibrator 20 to the user's finger through the operation panel 10.

The display device 60 includes a display controller 61 and a display 62. The display controller 61 displays a predetermined image on the display 62 in response to a signal output from the operation detector 51 and indicating the input operation of the user on the operation surface 11. The display 62 can use, for example, a liquid crystal display, but is not limited thereto and may use other types of displays such as an organic EL display or the like.

4. Specific Configuration of Input System

Figure 5:
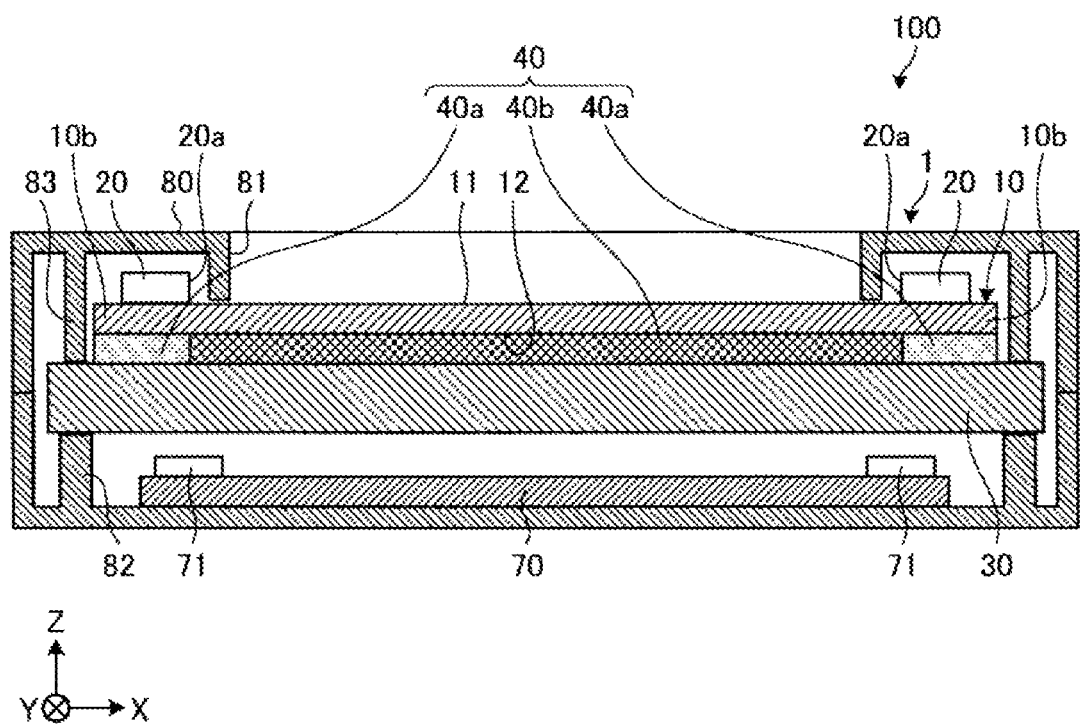
FIG. 5 is a cross sectional view taken along line V-V of FIG. 4.

Next, the input system 100 including the input device 1 will be described in detail with reference to FIG. 4 and FIG. 5. FIG. 4 is a plan view of the input system 100 according to the embodiment, and FIG. 5 is a cross sectional view taken along line V-V of FIG. 4.

The input system 100 includes the input device 1 described above, a control board 70 on which the controller 50 is mounted (see FIG. 5), and a housing 80. On the control board 70, connection terminals 71 (see FIG. 5) for the controller 50 are mounted in addition to the controller 50 and the like described above. The connection terminals 71 are electrically connected to the vibrators 20 through wirings (not shown).

The housing 80 is formed, for example in a substantially rectangular parallelepiped shape, and accommodates the input device 1, the control board 70, and the like. In FIG. 4, in order to better show the input device 1 and the like accommodated in the housing 80, the housing 80 is drawn by imaginary lines.

An opening 81 having a substantially rectangular shape in a plan view is formed in the housing 80. The operation panel 10 is disposed close to the opening 81 of the housing 80, and a portion of the operation panel 10 that is exposed through the opening 81 is the operation surface 11.

As shown in FIG. 5, the housing 80 includes a placing portion 82 and a pressing portion 83. The placing portion 82 protrudes upward from the bottom surface of the housing 80 to place the support panel 30. The pressing portion 83 protrudes downward from the top surface of the housing 80. Then, the pressing portion 83 presses the support panel 30 toward the placing portion 82. In this way, the input device 1 including the support panel 30 is stably held in the housing 80. The positions and shapes of the placing portion 82 and the pressing portion 83 shown in FIG. 5 are merely examples, and are not limited.

As shown in FIG. 4, the operation panel 10 of the input device 1 is a quadrilateral plate, specifically, a rectangular plate having a long side 10c and short side 10d. In addition, the support panel 30 is also a rectangular plate, like the operation panel 10. The support panel 30 has a long side and a short side, both of which are longer than the long side 10c and the short side 10d of the operation panel 10, respectively, in a plan view, that is, the support panel 30 is formed to have a larger area than that of the operation panel 10 in a plan view. The support panel 30 is formed to have a thickness greater than that of the operation panel 10, but it is not limited thereto.

The operation panel 10 and the support panel 30 are all made of glass having relatively high hardness. In this way, the operation panel 10 and the support panel 30 can have enhanced durability against external impact or heat, for example. The operation panel 10 and the support panel 30 are not limited to glass, and may be made of other kinds of materials such as a resin, or the like.

The vibrators 20 are mounted, for example in the vicinity of the short side 10d of the operation panel 10. In other words, the vibrators 20 are mounted at end portions in a long side direction (X axis direction) of the operation panel 10. The vibrators 20 are mounted, for example, facing with each other in the region outside the operation surface 11. In FIG. 4 and FIG. 5, the side surfaces of the vibrators 20 facing each other are denoted as reference numeral 20a.

As shown in FIG. 4, the adhesive portion 40 is positioned, for example, on the region outside of the operation surface 11. The adhesive portion 40 is provided at a position where the long side 10c of the operation panel 10 and the support panel 30 adhere to each other. In this way, it is possible to effectively generate high frequency vibration and low frequency vibration on the operation panel 10.

That is, when the operation panel 10 is bent due to vibration of the operation panel 10, generation of high frequency vibration, or the like on the operation panel 10 is hindered. Therefore, in the present embodiment, the long side 10c of the operation panel 10 which is likely to be bent and the support panel 30 adhere to each other by the adhesive portion 40, thereby making it possible to suppress the bending, and to effectively generate high frequency vibration and low frequency vibration on the operation panel 10.

The first adhesive portions 40a of the adhesive portion 40 are provided at the positions where the support panel 30 and four corners 10b of the operation panel 10 adhere to each other. As described above, the four corners 10b are included in peripheral regions 10a of the vibrators 20 on the operation panel 10 (see FIG. 4).

In this way, since first adhesive portions 40a having low hardness are provided on the four corners 10b of the operation panel 10, the operation panel 10 is more easily vibrated with respect to the support panel 30. In this way, for example, when the input device 1 vibrates the vibrators 20 at a low frequency, it is possible to more effectively generate vibration of a low frequency on the operation panel 10 with the vibrations of the vibrators 20.

The first adhesive portion 40a is positioned so as to be continuous with the second adhesive portion 40b. The first adhesive portion 40a and the second adhesive portion 40b may be integrally formed, or may be separately formed. The boundary surface 41 between the first adhesive portion 40a and the second adhesive portion 40b may be positioned so as to be flushed with the mutually facing side surface 20a of the vibrator 20. Here, the expression "be flushed with" means that the boundary surface 41 and the facing side surface 20a are not necessarily on the same plane and the deviation therebetween is within an allowable range including a certain degree of error.

In this way, when the input device 1 vibrates the vibrators 20 at a high frequency, it is possible to generate the standing wave W (see FIG. 1) on the operation panel 10 more effectively. That is, the standing wave W is generated at a portion of the operation panel 10 corresponding to the portion between the vibrators 20 facing each other. In the present embodiment, since the boundary surface 41 between the first and second adhesive portions 40a and 40b is positioned as described above, it is possible to position the second adhesive portion 40b having high hardness at the portion of the operation panel 10 corresponding to the portion between the vibrators 20 facing each other. In this way, when the input device 1 vibrates the vibrators 20 at a high frequency, the vibration of the vibrators 20 is difficult to be absorbed by the second adhesive portion 40b, and as a result it is possible to generate the standing wave W on the operation panel 10 more effectively.

As described above, the input device 1 according to the present embodiment includes the operation panel 10, the vibrators 20, the support panel 30, and the adhesive portions 40. The operation panel 10 has the operation surface 11. The vibrators 20 are mounted on the operation panel 10, and vibrate the operation panel 10 in a plurality of modes in which vibration frequencies are different. The support panel 30 is disposed to face a back surface 12 opposite to the operation surface 11 of the operation panel 10 and supports the operation panel 10. The adhesive portion 40 allows the operation panel 10 and the support panel 30 to adhere to each other.

The adhesive portion 40 includes the first adhesive portion 40a and the second adhesive portion 40b. The first adhesive portion 40a allows the peripheral regions 10a of the vibrators 20 of the operation panel 10 and the support panel 30 to adhere to each other. The second adhesive portion 40b allows the region, which has higher hardness than the first adhesive portion 40a and which is the region other than the peripheral regions 10a of the vibrators 20 in the operation panel 10, and the support panel 30 to adhere to each other. In this way, it is possible to effectively generate vibrations of a plurality of modes in which vibration frequencies are different on the operation panel 10.

The adhesive portion 40 is made to be adhesive tape. In this way, it is possible for the operation panel 10 and the support panel 30 to easily adhere to each other.

In the above, the material of the adhesive tape used as the first and second adhesive portions 40a and 40b is specifically shown, but these are merely examples and are not limited thereto. Although the adhesive tape is used as the first and second adhesive portions 40a and 40b, it is not limited thereto. That is, the first and second adhesive portions 40a and 40b may allow the operation panel 10 and the support panel 30 to adhere to each other, and may be adhesive or the like, for example.

In the electronic device system 200 described above, the input system 100 and the display device 60 are separately disposed (see FIG. 2), but it is not limited thereto. That is, the electronic device system 200 may be configured to include a touch panel in which the input system 100 and the display device 60 are integrated as shown in FIG. 6.

Figure 6:
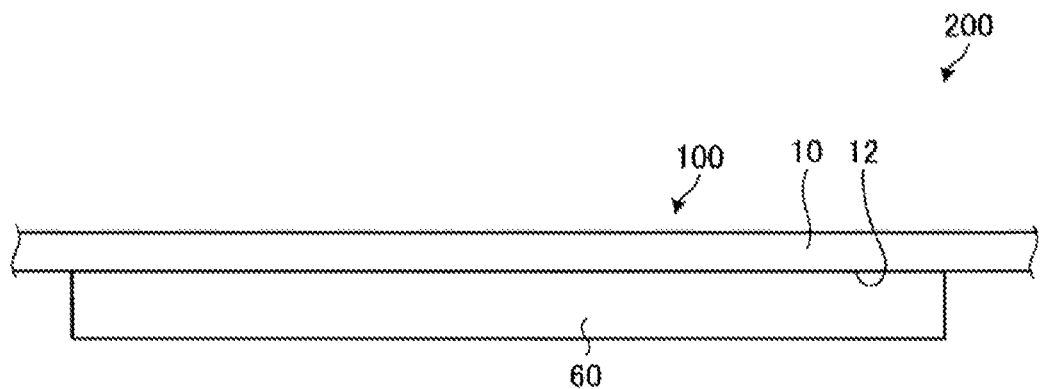
FIG. 6 is a view showing the relationship between the input system and a display device.

FIG. 6 is a view showing the relationship between the input system 100 and the display device 60 in the electronic device system 200. As shown in FIG. 6, the display device 60 is disposed on the back surface 12 of the operation panel 10, and the user can view the screen displayed on the display device 60 through the operation panel 10. In FIG. 6, the support panel 30 and the like is not shown.

5. Modified Example

Figure 7:
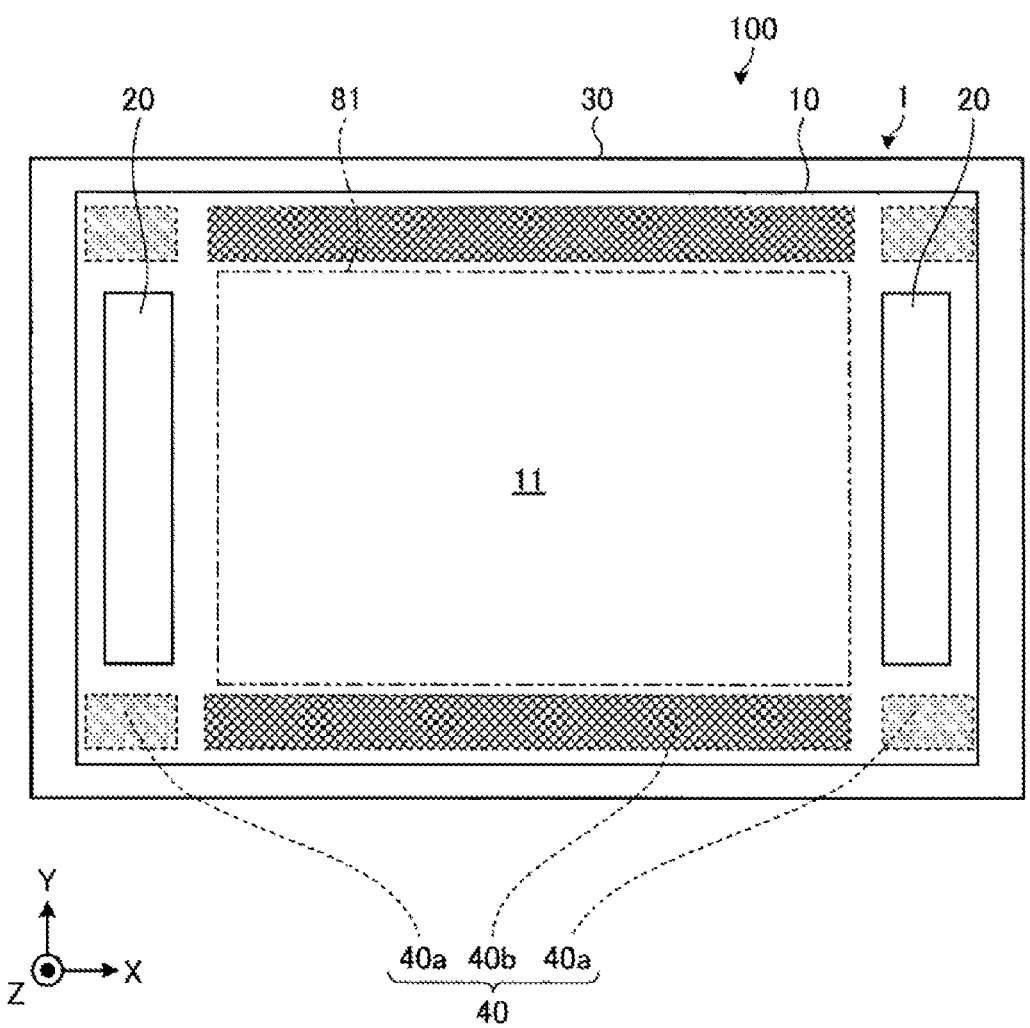
FIG. 7 is a plan view of an input system according to a modified example.

Next, an input system 100 according to a modified example will be described with reference to FIG. 7. FIG. 7 is a plan view of an input system 100 according to a modified example. In FIG. 7, illustration of the housing 80 and the like will be omitted. Further, in the following description, the common constituent elements common to those in the embodiment are denoted as the same reference numerals, and the description thereof will be omitted.

In the above-mentioned embodiment, the first adhesive portion 40a and the second adhesive portion 40b are disposed so as to be continuous, but it is not limited thereto. That is, as in the modified example shown in FIG. 7, the first adhesive portion 40a and the second adhesive portion 40b may be disposed apart from each other with a predetermined distance.

Even in the case, similarly to the embodiment, it is possible to efficiently generate vibrations of a plurality of modes in which vibration frequencies are different, such as high frequency vibration or low frequency vibration, on the operation panel 10.

In the above description, the vibrator 20 is mounted on the operation surface 11 of the operation panel 10, but it is not limited thereto. For example, the vibrator 20 may be mounted on the back surface 12 which is the opposite side of the operation surface 11 of the operation panel 10.

In the above description, an example in which the electronic device system 200 is mounted on a vehicle is represented, but it is not limited thereto. For example, the electronic device system 200 may be mounted on other types of devices such as a smartphone terminal or a tablet terminal.

Further effects and modified examples can be easily derived by those skilled in the art. Thus, broader aspects of the present invention are not limited to the specific details and the representative embodiment shown and described above. Accordingly, various modifications can be made without departing from the scope and spirit of the general inventive concept as defined by appended claims and equivalents thereof.

What is claimed is:

1. An input device comprising:
an operation panel that has an operation surface;
a vibrator that is mounted on a peripheral region of the operation panel and vibrates the operation panel in a plurality of modes having different vibration frequencies;
a support panel that is disposed to face a back surface of the operation panel that is opposite to the operation surface of the operation panel and supports the operation panel; and an adhesive portion that adheres the operation panel and the support panel to each other, wherein the adhesive portion includes a first adhesive portion that adheres the operation panel and the support panel to each other, a distance from a centroid of the first adhesive portion to a centroid of the vibrator being a first distance, and a second adhesive portion that has a higher hardness than a hardness of the first adhesive portion and adheres the operation panel and the support panel to each other, a distance from a centroid of the second adhesive portion to the centroid of the vibrator being a second distance, the second distance being longer than the first distance, wherein a plurality of the vibrators are mounted in a region outside the operation surface, adjacent to opposite ends of the operation surface, and wherein a boundary between the first adhesive portion and the second adhesive portion is flush with opposing side surfaces of the plurality of vibrators.

2. The input device according to claim 1, wherein
the operation panel is a quadrilateral plate, and
the first adhesive portion adheres four corners of the operation panel and the support panel to each other.

3. The input device according to claim 1, wherein
the operation panel is a rectangular plate, and
the adhesive portion adheres a long side of the operation panel and the support panel to each other.

4. The input device according to claim 1,
wherein the adhesive portion is an adhesive tape.

5. An input system comprising:
an input device that includes an operation panel that has an operation surface, a vibrator that is mounted on a peripheral region of the operation panel and vibrates the operation panel, a support panel that is disposed to face a back surface of the operation surface that is opposite to the operation surface of the operation panel and supports the operation panel, and an adhesive portion that adheres the operation panel and the support panel to each other, the adhesive portion including (i) a first adhesive portion that adheres the operation panel and the support panel to each other, a distance from a centroid of the first adhesive portion to a centroid of the vibrator being a first distance and (ii) a second adhesive portion that has a higher hardness than a hardness of the first adhesive portion and adheres the operation panel and the support panel to each other a distance from a centroid of the second adhesive portion to the centroid of the vibrator being a second distance, the second distance being longer than the first distance; and a vibration controller that controls the vibrator so as to vibrate the operation panel in a plurality of modes having different vibration frequencies, based on an operation on the operation panel, wherein the vibration controller controls the vibrator so as to switch between a first vibration mode in which vibration of a frequency in an ultrasonic band is generated on the operation panel and a second vibration mode in which vibration of a frequency band lower than the ultrasonic band is generated on the operation panel, based on the operation on the operation surface.

6. The input system according to claim 5, wherein
a plurality of the vibrators are mounted in a region outside the operation surface, adjacent to opposite ends of the operation surface, and
a boundary between the first adhesive portion and the second adhesive portion is flush with opposing side surface of the plurality of vibrators.

7. The input system according to claim 5, wherein
the operation panel is a quadrilateral plate, and
the first adhesive portion adheres four corners of the operation panel and the support panel to each other.

8. The input system according to claim 5, wherein
the operation panel is a rectangular plate, and
the adhesive portion adheres a long side of the operation panel and the support panel to each other.

9. The input system according claim 5,
wherein the adhesive portion is an adhesive tape.

10. An input device comprising:
an operation panel that has an operation surface;
a vibrator that is mounted on a peripheral region of the operation panel and vibrates the operation panel in a plurality of modes having different vibration frequencies;
a support panel that is disposed to face a back surface of the operation panel that is opposite to the operation surface of the operation panel and supports the operation panel; and
an adhesive portion that adheres the operation panel and the support panel to each other,
wherein the adhesive portion includes
a first adhesive portion that adheres the operation panel and the support panel to each other at a location in a vicinity of the vibrator, and
a second adhesive portion that has a higher hardness than a hardness of the first adhesive portion and adheres the operation panel and the support panel to each other at a location that is a second distance from the vibrator, the second distance from the vibrator being farther from the vibrator than the first distance from the vibrator is from the vibrator,
wherein the first adhesive portion extends outward, along a longitudinal direction of the operation panel, from a longitudinally outer edge of the second adhesive portion, and
wherein the first adhesive portion is aligned with the vibrator in plan view.

11. An input system comprising:
an input device that includes an operation panel that has an operation surface, a vibrator that is mounted on a peripheral region of the operation panel and vibrates the operation panel, a support panel that is disposed to face a back surface of the operation surface that is opposite to the operation surface of the operation panel and supports the operation panel, and an adhesive portion that adheres the operation panel and the support panel to each other, the adhesive portion including (i) a first adhesive portion that adheres the operation panel and the support panel to each other at a location that is a first distance from the vibrator and (ii) a second adhesive portion that has a higher hardness than a hardness of the first adhesive portion and adheres the operation panel and the support panel to each other at a location that is a second distance from the vibrator, the second distance from the vibrator being farther from the vibrator than the first distance from the vibrator is from the vibrator; and a vibration controller that controls the vibrator so as to vibrate the operation panel in a plurality of modes having different vibration frequencies, based on an operation on the operation panel wherein the first adhesive portion extends outward, along a longitudinal direction of the operation panel, from a longitudinally outer edge of the second adhesive portion, and wherein the first adhesive portion is aligned with the vibrator in plan view.

\* \* \* \* \*